(No Model.)

P. MILES.
HOOK.

No. 396,169.  Patented Jan. 15, 1889.

Attest:
Philip F. Larner
Nowell Bartlett

Inventor:
Purches Miles
By Wm. C. Sproud
Attorney.

N. PETERS, Photo-Lithographer, Washington, D. C.

UNITED STATES PATENT OFFICE.

PURCHES MILES, OF BROOKLYN, NEW YORK.

HOOK.

SPECIFICATION forming part of Letters Patent No. 396,169, dated January 15, 1889.

Application filed May 29, 1888. Serial No. 275,414. (No model.)

*To all whom it may concern:*

Be it known that I, PURCHES MILES, of Brooklyn, in the county of Kings and State of New York, have invented certain new and useful Improvements in Overhead or Ceiling Hooks for Wardrobes, &c.; and I do hereby declare that the following specification, taken in connection with the drawings furnished and forming a part of the same, is a clear, true, and complete description of my invention.

The object of my invention is to economically provide a neat, simple, effective, double overhead hook which can be readily secured in place without the aid of tools. I accomplish these ends by forming my hook from a continuous length of suitable wire which is bent to form two hooks, back to back, in one plane, and also to form bearing or abutting surfaces on the stem or shank of each hook and parallel therewith for contact with the surface to which they may be applied, the two terminals of the wire being respectively provided with an eye located between said bearing-surfaces and a screw-thread, so that the threaded terminal, serving as the main shank of the hook, may occupy said eye and, when properly screwed into place, cause a firm engagement of said abutting surfaces with the coincident surface of the wood.

To more particularly describe my invention I will refer to the accompanying drawings, in which—

Figure 1:
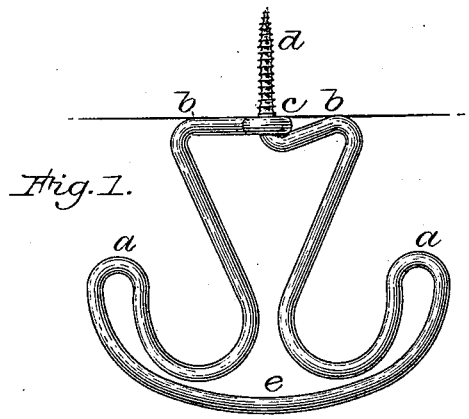
Figure 2:
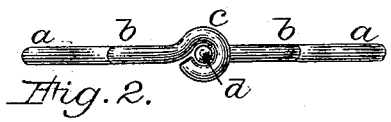

Figures 1 and 2 illustrate one of my hooks, respectively, in side and top views.

The hook shown is a double hook, in that it has two hooks, *a*, which are counterparts and hang back to back in the same plane, so that the hook, as a whole, is practically flat. Each hook has on its own stem or shank a top bearing-surface, as at *b*. One hook has an eye, *c*, and the other a screw-threaded shank, *d*, which occupies said eye on a line between the two hooks and at the middle of said bearing-surface. The two hooks are coupled at their lower ends by the bow-shaped portion *e* of the wire, which serves as a brace for either hook in preventing it from straightening under an ordinarily heavy load, and also in preventing the screw-shank from bending in certain directions, by enabling the bearing-surface *b* above either hook to resist the deflecting strains due to a load carried upon the other hook, because the deflection of either hook is resisted by the brace portion *e* and the other hook and the abutting contact of the bearing-surface *b* over the latter hook with the surface of the wood in which the hook is mounted. As a rule, it will be desirable that the threaded shank at its base be sufficiently depressed to allow the screw-eye to initially take bearing against the wood, so that as the screw is turned into the wood said eye will be depressed in advance of seating the bearing-surfaces at each side of the shank against the wood.

I am aware that double ceiling-hooks have heretofore been formed from a single length of wire; but said prior hooks involved the operation of twisting the vertical wire, so as to form a single shank for both hooks, and also an abutting collar at the base of the threaded portion of the hook. My hook is simpler in its construction and involves less complicated mechanism for its manufacture, and each hook has a shank of its own and a bearing-surface at its top for contact with the surface of the ceiling remote from the threaded shank, so that either hook is firmly braced against deflection under weight by the shank and bearing-surface of the other hook.

Having thus described my invention, I claim as new and desire to secure by Letters Patent—

The overhead double hook composed of a single length of wire having its two hooks back to back, both hooks coupled at their lower ends by a portion of the wire which serves as a brace, a bearing-surface at the upper end of each stem of each hook, an eye at one terminal of the wire midway between said bearing-surfaces, and a screw-threaded shank which occupies said eye, substantially as described.

PURCHES MILES.

Witnesses:
C. T. STORK,
A. A. FONDO.